Sept. 23, 1941. F. T. BARR 2,256,969
METHOD FOR CONTROL OF TEMPERATURE IN CATALYTIC EXOTHERMIC REACTIONS
Filed June 12, 1940
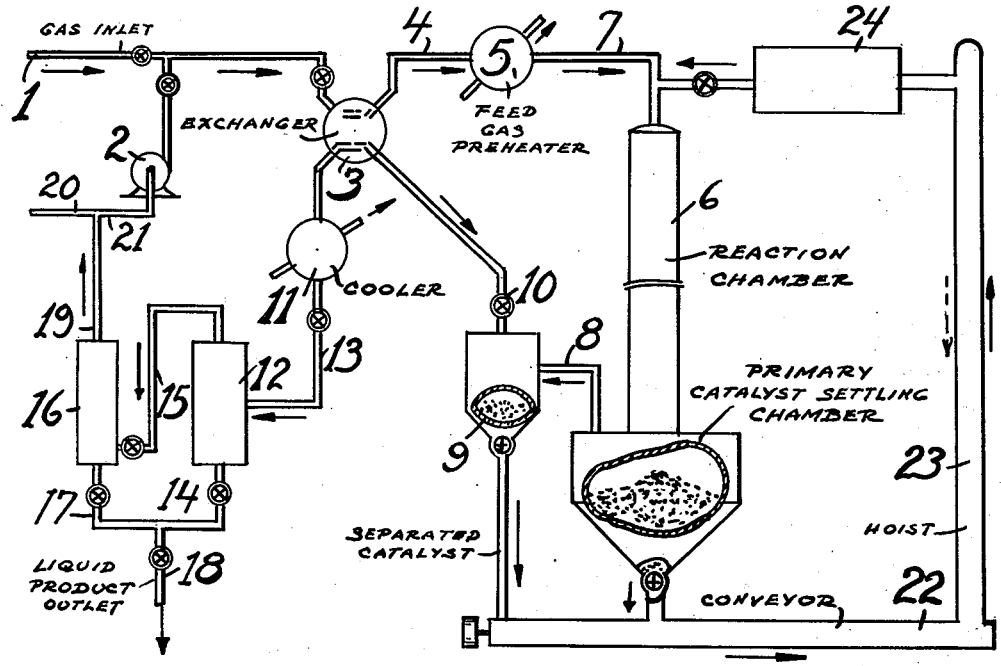
*FIG.-1*
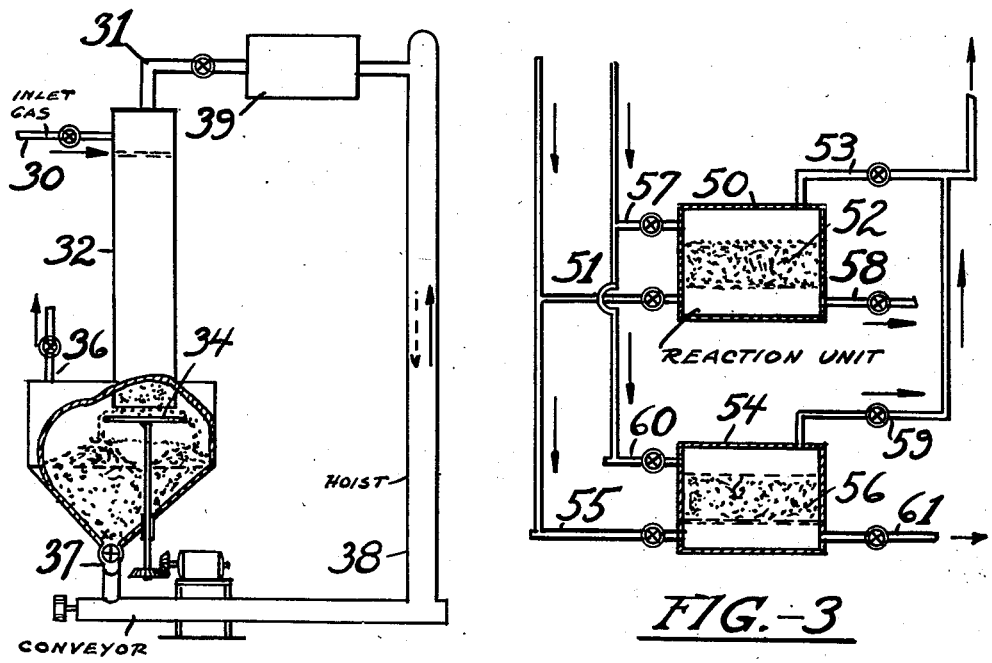
*FIG.-2*
*FIG.-3*
Frank T. Barr Inventor
By P. L. Young Attorney Patented Sept. 23, 1941

2,256,969

UNITED STATES PATENT OFFICE 2,256,969

METHOD FOR CONTROL OF TEMPERATURE IN CATALYTIC EXOTHERMIC REACTIONS

Frank T. Barr, Summit, N. J., assignor to Standard Oil Development Company, a corporation of Delaware Application June 12, 1940, Serial No. 340,062

5 Claims. (Cl. 260—449)

The present invention relates to the manufacture of valuable hydrocarbon products by the hydrogenation of carbon oxides. The invention is more particularly concerned with an improved method for controlling the isothermic reaction and maintaining the temperature within a predetermined critical temperature range. In accordance with the present process, the temperature within the reactor is positively controlled by absorbing at least a portion of the heat of reaction on the catalyst itself, withdrawing the catalyst from the reactor, removing the heat of reaction, and returning the same to the reactor.

It is known in the art to carry out various isothermic chemical reactions and to remove the heat of reaction by suitable means. These means usually comprise liquid cooling mediums which are circulated without or within the reaction zone. These methods of regulating the temperatures of various processes, while entirely satisfactory for most operations, have the disadvantage that the temperature is relatively difficult to control within a narrow range in operations of this character when the cooling medium is circulated without the reaction zone. When liquid cooling mediums are circulated within the reaction zone, there exists a tendency to disturb the equilibrium conditions of the reaction and to impair the quality of the final products. These disadvantages are particularly aggravated in chemical reactions involving the hydrogenation of carbon oxides for the production of the hydrocarbons having more than one carbon atom in the molecule, since it is essential that the temperature in these reactions be controlled so that no substantial temperature variation during the course of the reaction results.

In order to overcome the above-mentioned disadvantages and to satisfactorily control the temperatures of reactions involving the hydrogenation of oxides of carbon, it has been the practice to employ reaction zones of a relatively small diameter packed with a suitable catalyst. These reaction zones usually comprise tubes of relatively small diameter, or elements each consisting of one tube concentrically situated within a larger diameter tube or chamber, the intervening annular space being relatively thin. An indirect removal of heat of reaction is accomplished by introducing a cooling medium outside the single tube element, or outside the outer tube and inside the inner tube of the concentric tubes element, the catalyst being situated within and between the tubes respectively. While this arrangement permits, under certain conditions, a means of satisfactorily controlling the temperature of the reaction, it possesses an inherent disadvantage in that, owing to the necessity of using relatively small diameter of the tubes, the catalyst capacity per tube is low. This materially increases the cost of operations of this character and in many instances renders them commercially uneconomical.

I have now discovered an improved method by which it is possible to accurately and positively control the temperature of the reaction within the desired critical temperature range and thus materially increase the yields and qualities of the desired products. In accordance with my process, the isothermic heat of reaction is removed directly and immediately within the reaction zone by being taken up as the sensible heat of the catalyst itself. By operating in this manner no temperature gradient across the bed of the catalyst will result and thus undesirable side reactions will be prevented. In accordance with the present process, the catalyst is circulated through the reaction or synthesis zone, withdrawn after the temperature of the same is increased to a predetermined temperature, cooled without the synthesis zone to a predetermined temperature, and then recirculated to the reaction zone.

The process of my invention may be readily understood by reference to the attached drawing illustrating modifications of the same. Figure 1 illustrates an operation employing powdered catalyst in which the catalyst drops freely through the reaction zone. Figure 2 illustrates a modification of the process employing pilled catalyst, while Figure 3 illustrates an adaptation of the present process applied to an operation utilizing batch-type stages. Referring specifically to Figure 1, fresh synthesis gases comprising oxides of carbon and hydrogen are introduced into the system by means of feed line 1. These gases are combined with recycle gases which are introduced by means of compressor 2. The mixture is passed through exchanger 3, withdrawn by means of line 4, passed through feed gas preheater 5, and then introduced into reaction chamber 6 by means of line 7. These gases flow downwardly through reaction zone 6 and intimately contact a powdered catalyst selected from the class of catalysts having the ability to facilitate the reaction between oxides of carbon and hydrogen to produce hydrocarbon constituents containing more than one carbon atom in the molecule. The reaction gases are withdrawn from the bottom of reaction chamber 6 by means of line 8 and passed to a catalyst separator 9 which, for the purposes of description, is assumed to be a cyclone or equivalent separator. The reaction gases are withdrawn from separator 9 by means of line 10 passed through exchanger 3, cooler 11, and then introduced into initial stage 12 of a two-stage recovery unit by means of line 13. Temperature and pressure conditions are adapted to condense the relatively higher boiling constituents which are withdrawn from initial stage 12 by means of line 14. The uncondensed gases are removed overhead from initial stage 12 by means of line 15 and introduced into secondary stage 16 of the recovery plant in which temperature and pressure conditions are adapted to condense substantially the entire quantity of hydrocarbon constituents boiling in the gasoline boiling range. A conventional oil absorption process or equivalent means may be substituted for secondary stage 16 or for both stages 12 and 16. The condensate is withdrawn from secondary stage 16 by means of line 17 and preferably combined with the liquid product from initial stage 12. These combined streams are removed from the system as the final liquid product by means of line 18. This product may be further refined in any desirable manner. The uncondensed gases comprising unreacted and relatively low boiling hydrocarbon constituents are removed overhead from secondary stage 16 by means of line 19 and withdrawn from the system by means of line 20. A portion of the uncondensed gases from secondary stage 16 may be recycled to the reaction zone with the fresh synthesis gases by means of line 21. The powdered catalyst which collects in a catalyst accumulator section in the bottom of reaction chamber 6 and in the bottom of cyclone separator 9 is removed from these respective units by means of conveyor 22, hoisted by means of hoist 23, passed through a suitable cooling zone 24, and returned to the reaction zone as described.

Figure 2 illustrates a modification of the reaction chamber when employing pilled catalyst in accordance with the present process. The general operation is identical with the operation described with respect to Figure 1. The feed synthesis gases are introduced into the reaction zone 32 by means of feed gas line 30, while the catalyst is introduced into the reaction chamber by means of line 31. The pilled catalyst is packed throughout the reaction zone and moves downwardly through the reaction zone concurrently with the synthesis gases. The rate at which the catalyst moves downwardly through the reaction zone is controlled by suitable means of rotating type plate or equivalent means 34, the power for which is supplied from suitable external means 35. The pilled catalyst falls freely from the rotating plate into a catalyst accumulator section which forms an integral part of reaction chamber 32. The synthesized products were withdrawn from the reaction chamber 32 by means of line 36 and handled in a manner similar to that described with respect to Figure 1. It is to be noted that substantially no contact is secured between the synthesized products and the catalyst in the catalyst accumulator section. The catalyst is withdrawn from the bottom of the catalyst accumulator section by means of line 37, conveyed by suitable means 38 through cooling means 39, and then returned to the top of reaction chamber 32 and handled as described.

Referring specifically to Figure 3, feed synthesis gases comprising hydrogen and oxides of carbon in an initial stage are introduced into synthesis reacting unit 50 by means of line 51. These gases for a predetermined time period pass upwardly through synthesis chamber 50 through catalyst bed 52. The time period is determined by and is a function of the allowable temperature rise which is permitted within the catalyst bed. During the initial stage the synthesized products are withdrawn from reaction unit 50 by means of line 53 and handled for the recovery of the desired products in a manner similar to the method employed with respect to the operation described in Figure 1. When the temperature of the catalyst bed 52 rises to a predetermined maximum temperature the feed gases in a secondary stage are then introduced into the bottom of reaction unit 54 by means of line 55. During the secondary stage the feed gases pass upwardly through catalyst bed 56 under conditions adapted to produce the desired hydrocarbon products. During the secondary stage cooling gases are introduced into reaction unit 50 by means of line 57 and are withdrawn after passing through the hot catalyst bed by means of line 58. The amount of cooling gases and the temperature of the same are regulated in a manner to remove the heat of reaction absorbed by catalyst bed 52 in the initial stage. The synthesized products produced in reaction unit 54 during the secondary stage are withdrawn by means of line 59, passed to line 53, and handled as described. When the temperature of catalyst bed 56 rises to a predetermined temperature a new cycle is inaugurated and the feed gases are synthesized in reaction unit 50 in an initial stage, while the heat of reaction absorbed by catalyst bed 56 in the secondary stage is removed by means of cooling gases introduced into reaction unit 54 by means of line 60 which pass through catalyst bed 56 and are withdrawn by means of line 61. A desirable modification of the present invention is to pass the feed synthesis gases to stage 50 in heat exchange with the hot cooling gases withdrawn from stage 54 by means of line 61 and to pass the feed synthesis gases to reaction unit 54 in heat exchange with the hot cooling gases withdrawn from stage 50 by means of line 58.

The process of the present invention may be widely varied. The process essentially comprises employing the catalyst itself as the cooling means for removing the heat of reaction preferably by recirculating the same. Although the process may be applied for the removal of exothermic heat of reaction involving any process, it is particularly adapted to the removal of the heat of reaction in process involving the hydrogenation of oxides of carbon conducted under conditions to produce hydrocarbon products containing more than one carbon atom in the molecule.

These reactions are generally conducted at a temperature in the range from about 370° to about 410° F. It is essential in order to secure a satisfactory yield of the desired quality product that the temperature of the reaction does not vary substantially from the predetermined operating temperature. In general, to secure satisfactory results it is essential that the temperature of the reaction in processes of this character does not vary over a temperature range in excess of about 10° F. and preferably should not vary over a temperature range in excess of 5° F. The catalyst employed may be any suitable catalyst selected from the class of substances which are known as suitable catalysts for aiding the hydrogenation of oxides of carbon. Satisfactory catalysts are for example cerium, chromium, cobalt, manganese, osmium, palladium, titanium, zinc, iron, and oxides or other compounds of these metals. Mixtures of these catalysts may be employed or the same impregnated with suitable agents adapted to increase their efficiency or strength. In general, in carrying out the present process I have found it preferable to employ a finely divided or powdered catalyst. When employing a catalyst of this character the same may be uniformly distributed as it freely falls through the reaction zone and intimate contact is obtained between the concurrently flowing gases and powdered catalyst. A preferred modification of my invention is to regulate the flow of synthesis gases and catalysts in a manner whereby the velocity of the catalyst passing through the reaction zone exceeds the velocity of the flowing synthesis gases.

In order to further illustrate the process, the following example is given which should not be construed as limiting the invention in any manner whatsoever.

*Example 1*

In a process for the production of hydrocarbon constituents containing more than 1 carbon atom in the molcule from gas mixtures comprising oxides of carbon and hydrogen in which 85% of the feed gases react by contacting a suitable catalyst, the density of which was 100 lbs./cubic feet and the specific gravity 0.15, it was found that the catalyst had to be removed from the reaction zone after 1½ minutes of operation in order to maintain the temperature of the reaction within a 10° F. temperature range.

By employing the present process, no contamination of the products is secured and the equilibrium conditions are in no way affected by the presence of an inert cooling medium. Furthermore, undesirable temperature gradients are eliminated and a substantially constant uniform temperature throughout the reaction zone is readily attained.

What I claim as new and wish to protect by Letters Patent is as follows:

1. A process for the removal of the heat of reaction and maintaining a relatively constant temperature in a reaction involving the hydrogenation of oxides of carbon for the production of hydrocarbon constituents containing more than one carbon atom in the molecule which comprises passing feed gases containing oxides of carbon and hydrogen in contact with a suitable catalyst under conditions adapted to hydrogenate the oxides of carbon, whereby exothermic heat is evolved, removing the exothermic heat as it is evolved by utilizing a sufficient quantity of the catalyst and by absorbing the same as sensible heat of the catalyst, separating the heated catalyst from the reaction zone, removing the heat of reaction therefrom by cooling and again utilizing the cooled catalyst in the reaction zone.

2. A process for the removal of the heat of reaction and maintaining a relatively constant temperature in a reaction involving the hydrogenation of oxides of carbon for the production of hydrocarbon constituents containing more than one carbon atom in the molecule which comprises passing the catalyst and feed gases concurrently through a reaction zone under temperature and pressure conditions adapted to hydrogenate the oxides of carbon, removing the exothermic heat of reaction as it is evolved by utilizing a sufficient quantity of catalyst and absorbing the same as sensible heat of the catalyst, separating the heated catalyst from the reaction zone, removing the heat of reaction therefrom by cooling and again utilizing the cooled catalyst in the reaction zone.

3. Process in accordance with claim 2 in which said catalyst is powdered.

4. A process for the removal of the heat of reaction and maintaining a relatively constant temperature in a reaction involving the hydrogenation of oxides of carbon for the production of hydrocarbon constituents containing more than one carbon atom in the molecule which comprises passing feed gases containing oxides of carbon and hydrogen downwardly through a reaction zone, passing a freely falling catalyst concurrently downwardly through said reaction zone, removing the exothermic heat of reaction as it is evolved by utilizing a sufficient quantity of catalyst and absorbing the same as sensible heat of the catalyst, separating the heated catalyst from the reaction zone, removing the heat of reaction therefrom by cooling and again utilizing the cooled catalyst in the reaction zone.

5. Process in accordance with claim 4 in which the freely falling catalyst has a greater velocity downwardly through the reaction zone than the synthesis gases.

FRANK T. BARR.